United States Patent
Dayan et al.

[11] Patent Number: 6,151,211
[45] Date of Patent: Nov. 21, 2000

[54] ACTIVE VENTILATION OF A PACKAGED ELECTRONIC DEVICE DURING OPERATION

[75] Inventors: Richard Alan Dayan, Wake Forrest; Howard Jeffery Locker, Cary, both of N.C.

[73] Assignee: International Business Machines Corporation, Armonk, N.Y.

[21] Appl. No.: 09/458,754

[22] Filed: Dec. 10, 1999

[51] Int. Cl.[7] .................................................. H05K 7/20
[52] U.S. Cl. ...................... 361/690; 361/687; 361/688; 361/694; 361/695; 174/16.1; 174/15.1; 165/104.33; 165/185; 229/120
[58] Field of Search ................... 361/688–695; 174/15.1, 16.1, 17 VA; 165/80.3, 185, 104.33, 104.34; 454/184–186; 229/120; 217/42

[56] References Cited

U.S. PATENT DOCUMENTS

| | | | |
|---|---|---|---|
| 3,670,949 | 6/1972 | Galanes ..................................... | 229/120 |
| 3,863,831 | 2/1975 | Wozniacki et al. ....................... | 229/120 |
| 5,644,472 | 7/1997 | Klein ......................................... | 361/695 |
| 5,996,074 | 11/1999 | Houck et al. .............................. | 713/2 |

*Primary Examiner*—Leo P. Picard
*Assistant Examiner*—Boris L. Chervinsky

*Attorney, Agent, or Firm*—George E. Grosser; Andrew Dillon

[57] ABSTRACT

A carton for shipping a computer is provided with an access panel in one of its sidewalls. The access panel is located adjacent to the power connector, network connector, and power switch for the computer. The access panel provides external access to the connectors and the switch when the computer is packaged inside the carton. The carton also has an intake flap and an exhaust flap in its other sidewalls. If the computer needs to be reconfigured or otherwise electronically accessed, the task may be performed without removing the computer from the carton. The access flap is opened so that power and network cables may be coupled to the computer connectors. One end of a ventilation hose is attached to the aperture formed by the intake flap and the other end of the hose is secured to an air compressor. When the computer is operational, the air compressor supplies compressed air through the hose to force ventilating air into the carton. The air circulates inside the carton, around the computer and out the exhaust port to maintain the thermally sensitive components of the computer in an acceptable operating temperature range. In addition, ventilation may be supplied or augmented by evacuating air through the exhaust port.

22 Claims, 2 Drawing Sheets

ACTIVE VENTILATION OF A PACKAGED ELECTRONIC DEVICE DURING OPERATION

BACKGROUND OF THE INVENTION

1. Technical Field

This invention relates in general to ventilating electronic devices and in particular to an apparatus and method for actively cooling an electronic device. Still more particularly, the invention relates to cooling a computer that has been packaged for shipment while temporarily operating the computer inside the package without removing the packaging.

2. Description of Related Art

In today's business environment, the product cycle has been severely reduced to match the increased rate of new technology introductions. In order to ensure adequate supply upon customer request, manufacturers of complex products (e.g., personal computers) build, pack, stockpile, and ship product while sample testing is being performed. If a problem is found and the previously packaged products need to be changed or updated they must be unpacked. Unpacking, reconfiguring, and then repacking products is very costly and time consuming.

In U.S. patent application Ser. No. 08/971,242, entitled, "In-Box Configuration Apparatus for a Computer System," filed Nov. 14, 1997, and incorporated herein in its entirety by reference, a method for reconfiguring a computer system while it is in its shipping package is disclosed. The computer system is configured to respond when only power and a network connection are in place. Selective reconfiguration may be performed at a configuration center where a full complement of support and configuration alternatives are available. For example, the microcode or hardfile image may be updated without unpacking the computer even though the cooling vents are effectively blocked. The shipping package has limited provisions for passive cooling through apertures. This excellent solution for in-box operation avoids the time consumption and danger of system injury when custom configuration is performed with a full system unpack, setup, configure, breakdown and repack.

Unfortunately, some rework jobs require the computer system to be in operation for an extended period of time in order to accomplish the reconfiguration or update task. Depending upon the time involved, running the product in a closed package may cause the device to overheat and cause potentially permanent damage to the device even though the device is passively cooled. Thus, an active solution that prevents a product from overheating while it is operating inside of its packing materials and without having to unpack the product is needed.

SUMMARY OF THE INVENTION

A carton for shipping a computer is provided with an access panel in one of its sidewalls. The access panel is located adjacent to the power connector, network connector, and power switch for the computer. The access panel provides external access to the connectors and the switch when the computer is packaged inside the carton. The carton also has an intake flap and an exhaust flap in its other sidewalls. If the computer needs to be reconfigured or otherwise electronically accessed, the task may be performed without removing the computer from the carton.

The access flap is opened so that power and network cables may be coupled to the computer connectors. One end of a ventilation hose is attached to the aperture formed by the intake flap and the other end of the hose is secured to an air compressor. When the computer is operational, the air compressor supplies compressed air through the hose to force ventilating air into the carton. The air circulates inside the carton, around the computer and out the exhaust port to maintain the thermally sensitive components of the computer in an acceptable operating temperature range. In addition, ventilation may be supplied or augmented by evacuating air through the exhaust port.

Thus, an object of the invention is to provide ventilation for electronic devices.

Another object of the invention is to provide an apparatus and method for actively cooling an electronic device.

Yet another object of the invention is to cool a computer that has been packaged for shipment while temporarily operating the computer inside the package without removing the packaging.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
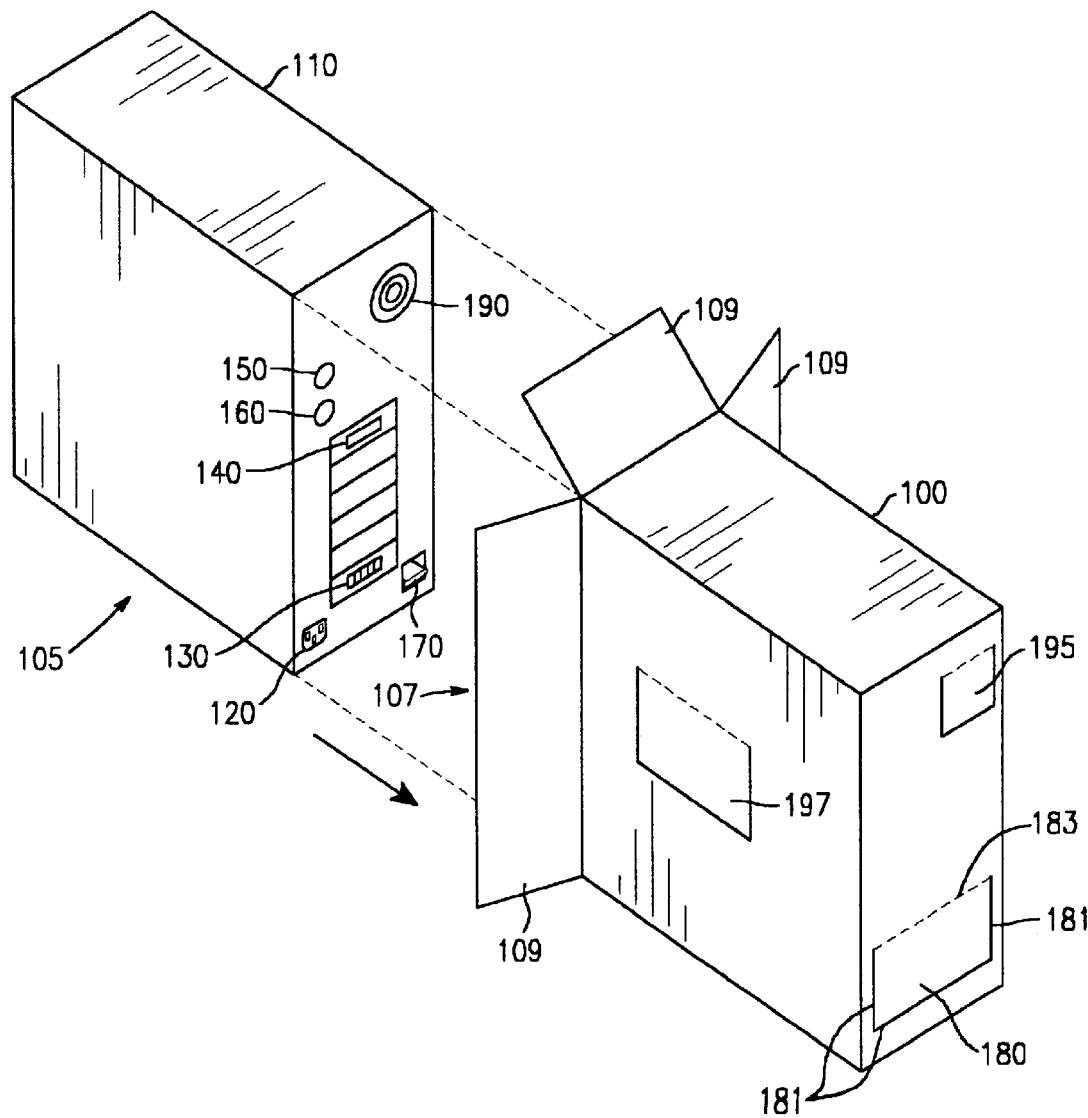
FIG. 1 is a schematic isometric drawing of a first embodiment of a shipping package for a computer system that supports active in-package ventilation.

Referring to FIG. 1, a generally rectangular shipping package or carton 100 is sized to enclose a computer apparatus 105 having an external computer housing 110. Carton 100 is preferably formed from corrugated cardboard materials or other suitable shipping materials such as those used to ship sensitive electronic components. Carton 100 has a large opening 107 with flaps 109 for loading and unloading computer 105 relative thereto. Computer housing 110 encloses a computer system and has a power connector 120, a network connector 130, a display connector 140, a keyboard connector 150, a mouse port 160, for interconnection therewith, and a power switch 170. Housing 110 also has a ventilation fan 190 for exhausting air therefrom during normal operation outside of carton 100.

A relatively small, pre-cut access flap or portal 180 of carton 100 is located adjacent to power connector 120, network connector 130, and power switch 170 for providing external access thereto when computer apparatus 105 is packaged inside carton 100. To reduce any weakening of carton 100, it is preferred to arrange connectors 120, 130 and switch 170 adjacent to one another so that a single port 180 may be formed in carton 100 as small as possible. In the illustrative embodiment shown, access port 180 is a generally rectangular flap with three side edges 181 that are cut completely through carton 100, and one side edge 183 that is scored in carton 100 to act as a pivot or hinge for flap 180.

In the preferred embodiment, carton 100 also has at least one pre-cut, ventilation intake port 195. Intake port 195 is also a rectangular flap, but is slightly smaller than flap 180. When computer 105 is in carton 100, flap 195 is also located directly adjacent to fan 190. Finally, carton 100 has a pre-cut, ventilation exhaust port 197 that is again illustrated as a rectangular flap. Naturally, flaps 180, 195, 197 may comprise many different shapes and sizes, and may be located in many different positions and orientations in carton 100, depending on the application. When flaps 180, 195, 197 are not in use, they lie in substantially the same plane as their respective side walls in carton 100. Flaps 180, 195, 197 and the apertures they define are considerably smaller than flaps 109 and opening 107 and, thus, incapable of loading/unloading computer 105 therethrough. Alternatively, port 195 may be combined with flap 180 such that a single flap and aperture perform both functions of interconnecting with and providing an intake port for computer 105.

Figure 2:
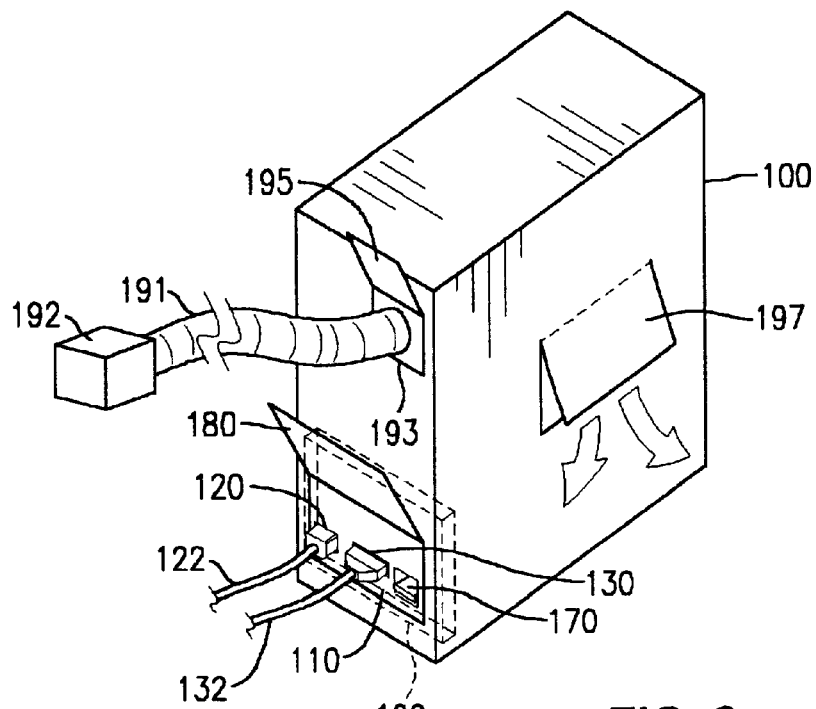
FIG. 2 is a reverse schematic isometric drawing of the shipping package of FIG. 1 in operation.

In operation, computer 105 is packaged inside carton 100 in a sealed configuration and is ready to ship or has been shipped when a need is perceived to reconfigure or otherwise access computer 105. In such circumstances, computer 105 may be electronically accessed without removing it from carton 100 or otherwise removing any of the packaging materials used to package computer 105 in carton 100. As shown in FIG. 2, computer 105 may be accessed while it is inside carton 100 by pivoting flap 180 to an open position. Connectors 120, 130 and switch 170 are located immediately adjacent to the aperture defined at flap 180 and are readily accessible therethrough. Carton 100 may also contain cushioning materials such as a foam-type insert 199 (shown in dashed lines) for protecting computer 105 from impacts. Insert 199 and all other contents included in carton 100 are likewise configured and located to allow access to computer 105. After flap 180 is opened, a power cable 122 and a network cable 132 are interconnected with connectors 120, 130 and a power source and network computer system, respectively.

Flap 195 on carton 100 is also pivoted to an open position and a flexible ventilation conduit or hose 191 is attached to the aperture formed therein. Hose 191 has an air compressor fitting 193 that may be provided either on the end of hose 191 or pre-installed in the aperture formed by flap 195. Fitting 193 conforms to the shape of the aperture at flap 195 and to hose 191 to minimize pressure losses. When hose 191 and cables 122, 132 are securely in place, switch 170 is moved to the "on" position to power up computer 105. An air compressor and/or vacuum 192 supplies a steady stream of pressurized or compressed air through hose 191 to force ventilation or cooling air into carton 100 while computer 105 is in operation. The air circulates inside carton 100 and provides an airflow around computer 10S. If desired, the compressed air may be directed into the ventilation port 190 in computer 105 to ventilate the interior of computer 105 as well before exiting the existing airflow portals in housing 110.

The amount of ventilation or cooling desired depends on several factors including but not limited to the ambient conditions, the compressed air temperature and pressure, the airflow dynamics within carton 100, the amount of energy being drawn by computer 105, the duration of operation of computer 105, and the strength of the packaging materials. In some cases, internal baffles within carton 100 or insert 199 may be needed to insure proper airflow and provide necessary cooling to prevent permanent damage to computer 105.

The pressurized ventilation air may be allowed to exhaust from carton 100 in a number of ways. In the preferred embodiment, the pressurized air forces the at least one exhaust flap 197 outward to an open position (FIG. 2) to allow the air warmed by the operation of computer 105 to escape carton 100. In this embodiment, the strength of the packaging materials and, in particular, the wall thickness of carton 100 is important in order to force exhaust flap 197 open. Moreover, some or all of the exhaust air may be allowed to escape carton 100 through the aperture formed at access flap 180.

Alternatively, hose 191 may be evacuated by a vacuum 192 instead of pressurized by a compressor. When hose 191 is evacuated, cool ambient air would be allowed to enter and pulled into carton 100 through the aperture at flap 180, 197, or other apertures provided therein. After circulating around computer 105, the warmed air exhausts out of the aperture at flap 195. When the operation with computer 105 is complete, switch 170 is turned off and cables 122, 132 and hose 191 are detached so that flaps 180, 195, 197 may be returned to their closed positions wherein they are flush and in-plane with their respective sidewalls on carton 100 (see FIG. 1).

When the compressor 192 supplies pressurized air to carton 100 to provide cooling to computer 105, the flaps 180, 195, 197 may be returned to their closed positions by momentarily switching compressor 192 into a vacuum mode of operation. The vacuum pulls flaps 180, 195, 197 inward from their open positions until they are flush with their respective planes on carton 100. If the compressor 192 is used in a vacuum mode to pull air from outside carton 100 into the holes defined at flaps 180, 195, 197, those flaps are pushed outward to their closed positions by momentarily pressurizing carton 100. Finally, the aperture defined at flap 197 also may be used as a hand hold to facilitate handling and movement of carton 100.

Figure 3:
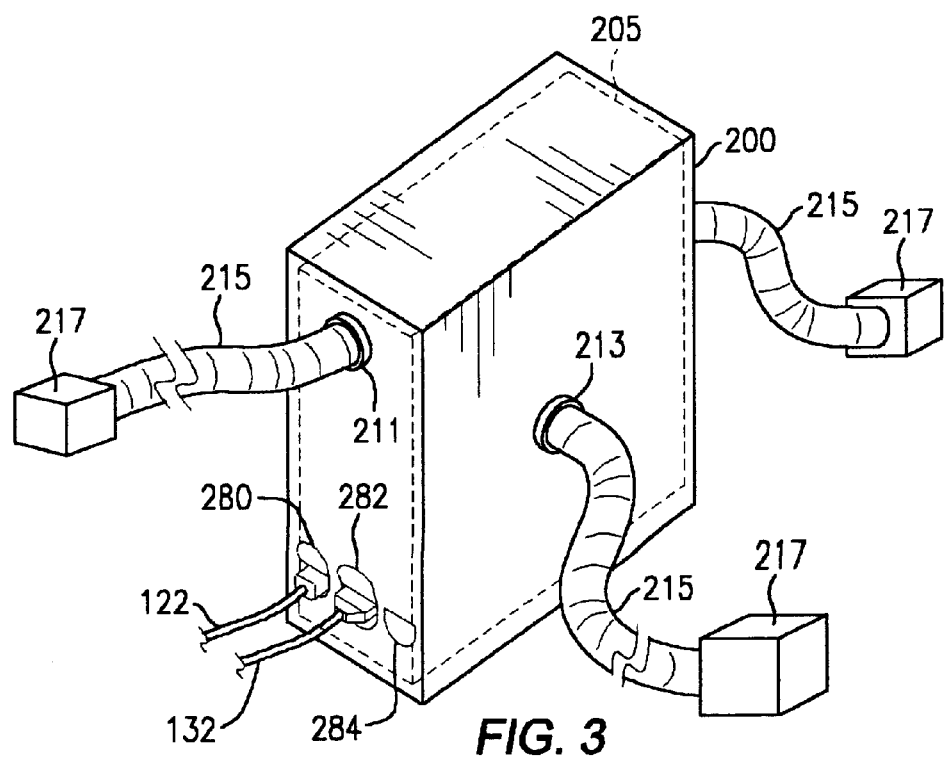
FIG. 3 is a schematic isometric drawing of a second embodiment of the shipping package of FIG. 1 in operation.

A second illustrative embodiment of the invention is shown in FIG. 3. Here, a sealed carton 200 containing a computer 205 (shown in dashed lines) are very similar to carton 100 and computer 105, described above. However, instead of a single access port 180, carton 200 has individual access ports 280, 282, 284 for power cable 122, network cable 132 and a power switch (not shown). Ports 280, 282, 284 are shown as small, semi-circular, hinged flaps, but may comprise many different shapes, sizes, and locations depending on the application. In this embodiment, carton 200 is fitted with at least two portals 211, 213, each having an air compressor/vacuum fitting. Portals 211, 213 may be covered with plugs or flaps like carton 100 when not in use. One end of a ventilation hose 215 is securely mounted to each portal 211, 213 for ventilating carton 200, and the other ends of hoses 215 are connected to an air compressor/vacuum unit 217.

In operation, computer 205 is packaged inside carton 200 and may be electronically accessed without removing it from carton 200. Flaps 280, 282, 284 are pivoted to an open position, cables 122, 132 are interconnected to computer 205, and the power switch is turned on. A ventilation hose 215 is attached to the fittings at each portal 211, 213. Air compressor/vacuum 217 selectively applies a vacuum and compressed air through hoses 215 to force ventilation or cooling air through carton 200 while computer 205 is in operation. For example, carton 200 could be pressurized at portal 211 and evacuated at portal 213. If desired, the compressed air may be directed into the ventilation port in computer 205 to ventilate the interior of computer 205 before exiting the existing airflow portals in its computer housing. The various alternatives, options, and configurations described above for the first embodiment may be readily applied in this embodiment as well.

The present invention has several advantages including the ability to actively rather than passively cool and ventilate an electronic device while it is operating even though it has already been packaged for shipment. The electronic device need not be unpackaged in any manner since its shipping carton is configured and provided with the necessary features to facilitate operation and adequate ventilation.

While the invention has been shown or described in only some of its forms, it should be apparent to those skilled in the art that it is not so limited, but is susceptible to various changes without departing from the scope of the invention.

What is claimed is:

1. An apparatus for actively ventilating an operational electronic device located inside a sealed package, comprising in combination:

an electrical device having a power connector and an input/output connector;

a package containing the electrical device in a sealed configuration for shipment thereof, the package having an access port and at least one ventilation port, the access port being located adjacent to the power connector of the electrical device;

a cable extending through the access port and interconnected with the power connector;

a ventilation conduit having a first end secured to the ventilation port;

an air movement device secured to a second end of the ventilation conduit; and wherein when the electrical device is operational, the air movement device actively moves air through the package via the ventilation conduit to maintain the electrical device within an acceptable operating temperature range.

2. The apparatus of claim 1 wherein the electrical device is a computer and the input/output connector is a network connector.

3. The apparatus of claim 1 wherein the package is a cardboard shipping carton.

4. The apparatus of claim 1 wherein the ventilation conduit is a flexible hose with a fitting for connection to the ventilation port.

5. The apparatus of claim 1 wherein the ventilation port has a fitting for connection to the ventilation conduit.

6. The apparatus of claim 1, further comprising a movable flap located adjacent to each of the ports in the package.

7. The apparatus of claim 1 wherein the ventilation port comprises an intake port and an exhaust port.

8. The apparatus of claim 1 wherein the electrical device has a cooling vent that is located adjacent to the ventilation port in the package, and wherein the air movement device forces air through the cooling vent such that an interior of the electrical device is ventilated.

9. The apparatus of claim 1 wherein the air movement device provides compressed air.

10. The apparatus of claim 1 wherein the air movement device provides a vacuum.

11. The apparatus of claim 1 wherein the access port of the package is also located adjacent to the input/output connector of the electrical device, and a second cable extends through the access port and is interconnected with the input/output connector.

12. A shipping container for actively ventilating a computer while the computer is operating inside the shipping container, the computer having a power connector and a network connector, the shipping container comprising:

a plurality of sidewalls;

a loading opening in one of the sidewalls for placing the computer in and out of the shipping container;

an access panel formed in another one of the sidewalls and adapted to be located adjacent to the power and network connectors of the computer, the access panel defining an access port and being movable relative thereto between an open position wherein the power and network connectors of the computer are accessible, and a closed position wherein the access port is sealed and the access panel is substantially flush with said another one of the sidewalls;

a ventilation intake panel formed in a selected one of the sidewalls, the intake panel defining an intake port and being movable relative thereto between an open position wherein air may be forced into the container, and a closed position wherein the intake port is sealed and the intake panel is substantially flush with said selected one of the sidewalls, the intake port being adapted to be connected to a ventilation conduit;

a ventilation exhaust panel formed in another selected one of the sidewalls, the exhaust panel defining an exhaust port and being movable relative thereto between an open position wherein air may be evacuated from the container, and a closed position wherein the exhaust port is sealed and the exhaust panel is substantially flush with said another selected one of the sidewalls; and wherein the container is adapted to ventilate an operational computer located therein and maintain the computer within an acceptable operating temperature range when the computer is electronically accessed through the access port and air is circulated from the intake port, through the shipping container, and out the exhaust port.

13. The shipping container of claim 12 wherein the sidewalls are formed from cardboard.

14. The shipping container of claim 12, further comprising an air compression fitting mounted in the intake port and adapted to be connected to the ventilation conduit.

15. The shipping container of claim 12, further comprising an air compression fitting mounted in the exhaust port and adapted to be connected to the ventilation conduit.

16. The shipping container of claim 12 wherein the access panel and the access port comprise a plurality of respective access panels and access ports.

17. The shipping container of claim 12 wherein a selected one of the ventilation intake and exhaust panels is adapted to be returned to its closed position by reversing a direction of the air circulated through the shipping container.

18. A method of actively ventilating an operational electronic device located inside a container, the method comprising the steps of:

providing an electrical device inside a sealed shipping container, the electrical device having electrical connectors;

interconnecting electrical cables to the electrical connectors of the electrical device through an access port in the container;

attaching one end of a ventilation conduit to a ventilation port in the container and the other end of the ventilation conduit to an air movement device;

operating the electrical device while simultaneously ventilating the container via the ventilation conduit to maintain the electrical device within an acceptable operating temperature range.

19. The method of claim 18 wherein the step of attaching one end of a ventilation conduit to a ventilation port comprises mounting the ventilation conduit to a compressed air fitting in the ventilation port.

20. The method of claim 18 wherein the step of operating the electrical device while simultaneously ventilating the container comprises forcing compressed air into the container.

21. The method of claim 18 wherein the step of operating the electrical device while simultaneously ventilating the container comprises evacuating air from the container.

22. The method of claim 18 wherein the step of operating the electrical device while simultaneously ventilating the container comprises forcing air through the container and an interior of the electrical device.

* * * * *